April 7, 1964  G. A. LOEGERING ETAL  3,128,067
ASYMMETRIC HYPER-VELOCITY LEADING EDGES
Filed Oct. 26, 1961  4 Sheets-Sheet 1

INVENTORS
GEORGE A. LOEGERING
MARTIN R. KINSLER
BY  ROBERT T. LANCET

Charles F. Dischler
ATTORNEY

*INVENTORS*
GEORGE A. LOEGERING
MARTIN R. KINSLER
ROBERT T. LANCET

BY Charles F. Dischler
ATTORNEY

United States Patent Office 3,128,067
Patented Apr. 7, 1964

3,128,067
ASYMMETRIC HYPER-VELOCITY
LEADING EDGES
George A. Loegering, Manhattan Beach, Martin R. Kinsler, Los Angeles, and Robert T. Lancet, Van Nuys, Calif., assignors to North American Aviation, Inc.
Filed Oct. 26, 1961, Ser. No. 147,807
5 Claims. (Cl. 244—117)

This invention relates to a leading edge or nose cone type of structure for withstanding extremely high temperatures and in particular it relates to an asymmetric leading edge applicable to a hyper-velocity cruise or re-entry vehicle.

A leading edge, nose cone or other forwardly projecting portion of a hypersonic aerospace vehicle is normally subjected to temperatures and heating rates far greater than the temperatures and heating rates imposed upon the remainder of such a vehicle during its passage through a relatively dense atmosphere. Such conditions exist to the maximum extent during reentry of an orbital vehicle into an atmosphere such as that which surrounds the earth and some of the other planets.

In the prior art a number of approaches have been utilized in attempting to solve the problem of reducing the aerodynamic heating rates for nose structures and the leading edges of lifting or control surfaces for hyper-velocity reentry and cruise vehicles. Several of such approaches include the use of ablation-type structures or leading edge internal cooling systems. An ablating structure, however, has the disadvantage of requiring frequent replacement or repair while an internal cooling system introduces added weight and complexity.

The most generally accepted design approach has been to utilize uncooled, nonablative types of leading edge and nose cone structures that employ radiation from solid surfaces as well as conduction and heat storage to reduce and control the effects of aerodynamic heating of the structure. Several general techniques have been practiced to reduce the effects of such heating. These include reduction of heat transfer rates by increasing the leading edge radius, redistribution of heat entering the structure by radiation to space and radiation and conduction to cooler portions of the structure. An allied approach includes the development of materials better able to withstand the temperatures and the temperature gradients caused by the high rates of heating. In conformance with the first mentioned of such techniques, it has become the generally accepted practice in the art to design uncooled, nonablative nose structures and lifting or control surface leading edges having a highly blunted configuration. Such a configuration has been necessitated by the fact that there are no known materials, which, if formed into a sharp leading surface, would be able to withstand the high stagnation temperatures to be encountered during a reentry maneuver. Blunting, however, in the manner in which it generally has been heretofore used, has the disadvantage of requiring a relatively thick wing resulting in an increase in the drag and thereby reducing the vehicle reentry maneuvering capabilities. It also increases the transonic stability and control problems over those now experienced with thinner wings having relatively sharp leading edges.

The present invention provides an uncooled, nonablative nose or leading edge structure for a hyper-velocity reentry vehicle having a uniquely blunted nose portion providing a reduced stagnation line heating rate. More specifically, the present invention provides an asymmetrical blunted nose or leading edge structure having a radius of curvature that is large relative to the thickness of the structure thereby providing greatly reduced heating rates in the stagnation region. The bluntly curved nose or leading edge portion is oriented with respect to the design range of angles of attack to control the location of the stagnation point and provide the maximum possible radius of the bluntly curved surface and thereby the lowest possible stagnation region heating rates. The application of the present invention to a hyper-velocity wing structure permits the utilization of more sophisticated thin wing configurations having reduced drag and higher lift-to-drag ratios than have previously been obtainable using blunted leading edges.

Accordingly, it is an object of this invention to provide an uncooled, nonablative leading edge or nose structure capable of sustaining extremely high temperatures for prolonged periods of time.

It is also an object of this invention to provide a leading edge or nose cone structure capable of withstanding the thermal shock, high temperatures, and environmental conditions occurring during hypersonic re-entry of an aerospace vehicle into a planetary atmosphere.

Another object of this invention is the provision of an asymmetrically blunted leading edge or nose cone structure providing reduced heating rates in the stagnation point region.

Another object of this invention is the provision of a bluntly curved leading edge that is oriented with respect to the angle of attack to provide the maximum possible leading edge radius.

Still another object of this invention is the provision of a bluntly curved leading edge structure that is oriented with respect to the design range of the angles of attack to control the location of the stagnation point and thereby the region of maximum heating.

These and other objects and advantages of the present invention will become apparent to those skilled in the art after reading the present specification and the accompanying drawings forming a part thereof, in which.

Figure 1:
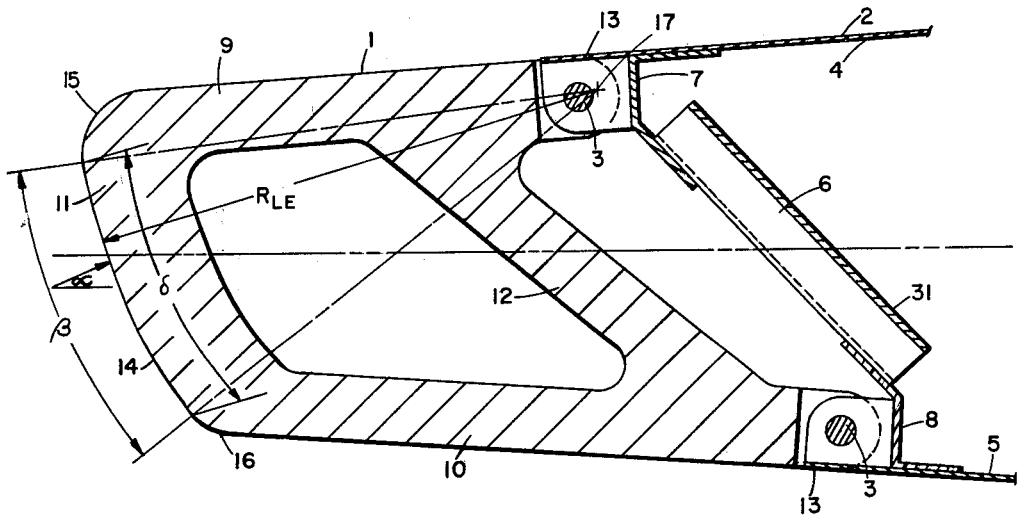
FIG. 1 is a chordwise sectional view through a leading edge structure in accordance with the present invention showing such leading edge in assembled relationship with the suporting airfoil structure.

Optimizing a nose cone or leading edge structure for a hypersonic cruise or reentry vehicle requires consideration of the most desirable leading edge configuration and of the best materials available to withstand the high leading edge temperatures and stagnation line heating rates expected to be encountered.

The stagnation line heating rates for hypersonic design velocities and conditions may be readily approximated from the laminar flow equation of Kemp and Riddle, as modified for two-dimensional flow and the assumption that the ratio of the enthalpy of the flow at the wall to the enthalpy of the flow at the edge of the boundary layer is small. As set forth in "Heat Transfer to Satellite Vehicles Reentering the Atmosphere," Jet Propulsion, volume 27, No. 2, February 1957, the Kemp and Riddle equation is:

$$q_s = \frac{14700}{\sqrt{R}} \sqrt{\frac{\rho_\infty}{\rho_{SL}}} \left(\frac{V_\infty}{V_c}\right)^{3.25}$$

where:

$q_s$=stagnation heating rate (B.t.u./ft.²-sec.)
$R$=leading edge radius (ft.)
$\rho_\infty$=free stream density (lb./ft.³)
$\rho_{SL}$=sea level density (lb./ft.³)
$V_\infty$=free stream velocity (ft./sec.) and
$V_c$=circular velocity (26,000 ft./sec.)

For a near-earth circular orbit, reentry velocities may be of the order of 26,000 feet per second, while for a noncircular orbit the reentry speed may be as great as 36,000 feet per second. The maximum heating rate occurring during a typical 26,000 foot per second orbital reentry has been computed by means of the above equation for a semi-circular leading edge of one inch radius. When positioned at a constant 45° angle of attack and zero sweep (leading edge normal to the airflow) the heating rate for such a leading edge is computed as being approximately 200 B.t.u./second-square foot. This heating rate is encountered at a velocity of about 22,000 feet per second and an altitude of 240,000 feet. For a typical superorbital reentry of 36,000 feet per second, a maximum stagnation line heating rate of approximately 1,000 B.t.u./second-square foot may be computed as occurring at a 45° angle of attack at about 34,000 feet per second and an altitude of approximately 230,000 feet.

For a swept wing vehicle configuration, the ratio of the swept wing leading edge stagnation line heating rate to the nonswept or zero sweep stagnation line heating rate is believed to vary substantially as a cosine function of the effective sweep angle. Thus, for a 70° sweep leading edge having a one inch radius, the expected peak heating rates for 36,000 and 26,000 feet per second velocities then become approximately 750 and 150 B.t.u./second-square foot, respectively. The foregoing examples are based on laminar flow theory. Computation of the heating rates near the stagnation point in accordance with currently available turbulent flow theory gives rates that are much lower than those computed according to laminar flow theory and thus the latter are on the conservative side. The asymmetric stagnation line heating rate may be shown by calculation to be about 50% less than that for a symmetric circular leading edge of the same thickness. The computed asymmetric heating rates have been confirmed by shock tube tests to be further described hereinbelow. The results of such tests are graphically shown in FIG. 2.

In attempting to reduce heating rates without requiring an increase in thickness at the leading edge of a wing, it has been suggested in the prior art that the leading edge have a larger radius of curvature at the stagnation line than that for a symmetric hemicylinder of a diameter equal to the wing thickness at the leading edge. It is the primary feature of the present invention that a leading edge of a radius greater than half the distance between the opposite surfaces of the body contiguous with and supporting such leading edge is oriented asymmetrically with respect to the longitudinal axis of the supporting body. It is a further feature that the leading edge curved surface is oriented asymmetrically with respect to the longitudinal axis of the supporting wing or body so that the stagnation point location remains substantially at the center of the leading edge curve through the full design range of angles of attack.

Referring specifically to FIG. 1 of the drawings, the inventive concept is illustrated herein as embodied in a leading edge structure for a wing or airfoil which is positioned at an angle of attack α relative to the free air stream. Reference numeral 1 generally indicates a refractory type leading edge attached to a metal supporting structure 2. Attachment of the leading edge to the supporting structure is preferably by means of hinge joint pin connections 3 of the type described in copending application Serial No. 132,953, now Patent No. 3,114,524, assigned to the assignee of the present application. Supporting structure 2 comprises wing skins 4 and 5 secured to a front spar 6 by attachment members 7 and 8.

Leading edge 1, which preferably consists of spanwise segments of any optimum length, may be of a solid or hollow construction. As illustrated herein, it is of a hollow arrangement defined by upper and lower walls 9 and 10, respectively, and front and rear walls 11 and 12, respectively. The exterior surfaces of upper and lower walls 9 and 10 form aerodynamically smooth continuations of wing skins 4 and 5. All of these wall members of the leading edge structure have a substantially constant thickness considerably larger than that of associated wing skins 4 and 5, of which they form a continuation. Preferably, the leading edge refractory material has a high thermal conductivity which, with its relatively large mass, results in considerable heat flow from the stagnation region downstream toward the rearmost extremity 13 of the leading edge structure. As set forth in the aforementioned copending application, such a construction aids in lowering the stagnation temperature and decreasing the chordwise temperature gradient by increasing the surface temperature and thereby the thermal radiation at the rearmost portion of the leading edge structure. As further set forth in that application, rear wall 12 acts as a thermally conductive path serving to equalize the temperatures at the rear of the leading edge structure and as a radiation shield protecting the metallic supporting structure 2.

Figure 3:
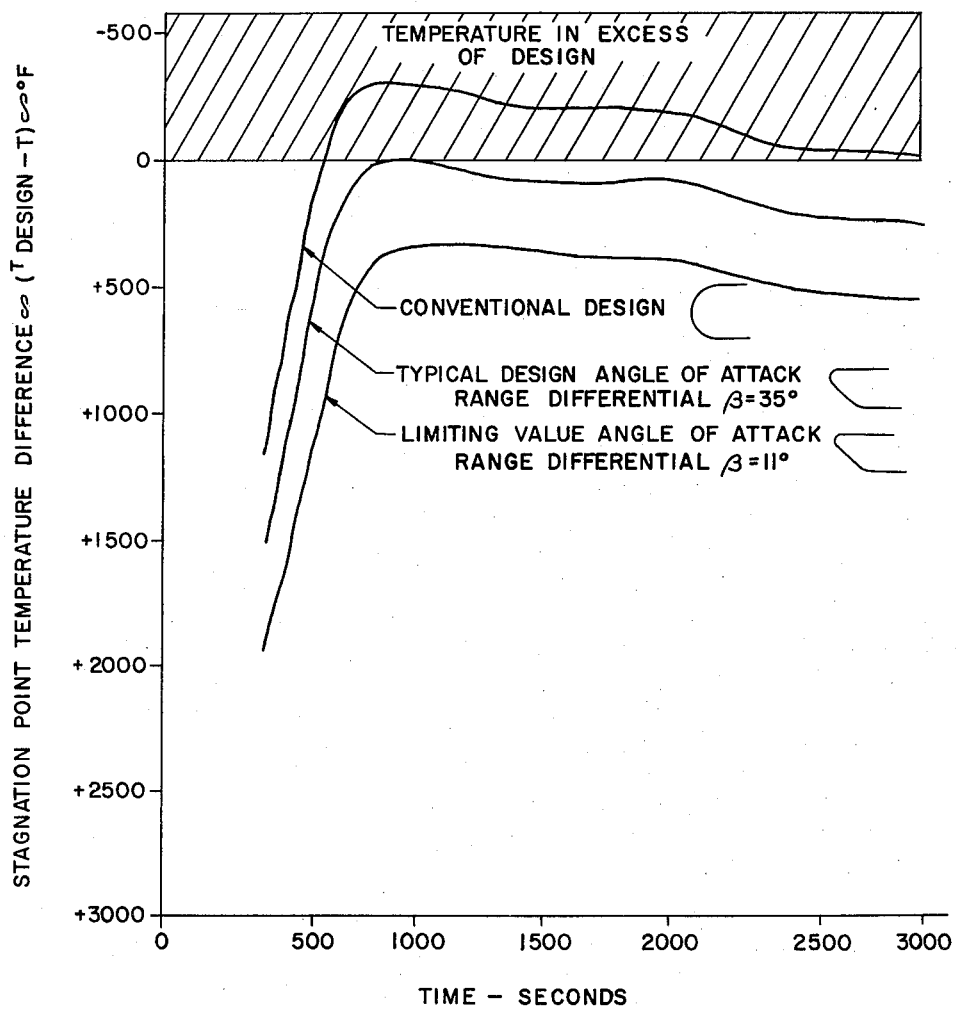
FIG. 3 is a graphical presentation of stagnation point temperature differences with time for a hemicylindrical leading edge, a bluntly curved asymmetric leading edge, and a planar asymmetric leading edge.

In accordance with the present invention, forward end wall 11 has an external curved surface 14 having a large radius of curvature terminating in more sharply curved arcuate end portions 15 and 16 which fair smoothly into the exterior surfaces of upper and lower walls 9 and 10, respectively. The center of curvature 17 of curved surface 14 is offset above the longitudinal axis of the structure so that surface 14 is asymmetric to such axis and oriented to face downwardly therefrom. By this asymmetric orientation of curved surface 14 the length δ of such surface is increased relative to the thickness of the leading edge, thereby providing a large angle of attack design range wherein the stagnation point will remain within the length δ of the bluntly curved surface 14. Decreasing the degree of curvature or, conversely, increasing the radius of curvature $R_{LE}$ of leading edge surface 14 results in lowering the stagnation temperature but this also lowers the allowable operating angle of attack range β. For the limiting case of an asymmetrical planar leading edge, as shown in FIG. 3, the allowable angle of attack range is only 11°. This is normally to critical for general use but in certain special applications it may be of utility. A design in accordance with the present invention, having a radius of curvature greater than the nominal thickness of the leading edge structure, would normally have a design angle of attack range or differential β of about 35°. FIG. 3 demonstrates the relationship between the conventional hemicylindrical leading edge, the preferred curved asymmetric leading edge of this invention and the limiting case of an asymmetric planar leading edge for a typical orbital reentry. Each of the leading edge has the same thickness. The stagnation point temperature difference, a constant maximum limit design temperature minus the predicted stagnation temperature, is plotted as a function of time.

Figure 4:
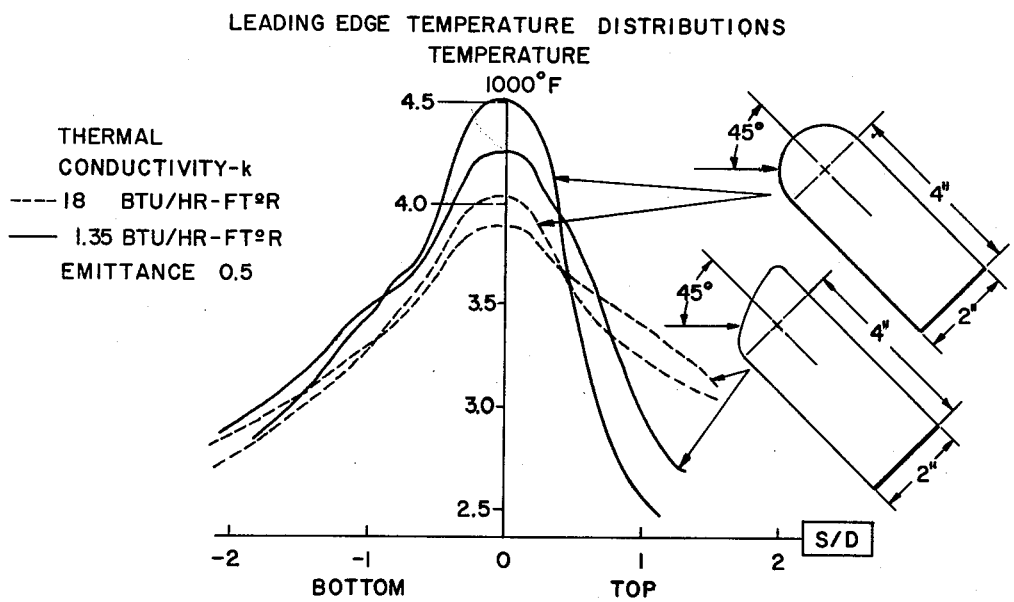
FIG. 4 is a graph showing curves of computed temperature distribution along the surface of the leading edge for a symmetrical and an asymmetrical configuration for several materials having different values of thermal conductivity.

FIG. 4 shows the theoretical advantage of the asymmetrically configured leading edge over a normal symmetric hemicylindrical leading edge from the standpoint of temperature distribution and peak temperature. The curves of this figure were computed by means of a digital computer utilizing a finite difference form of the two-dimensional transient heat flow equation:

$$\frac{\Delta T_i}{\Delta t} = \frac{\dot{q}_{stored_i}}{(V \rho C_p)_i}$$

where:

$$\dot{q}_{stored_i} = \dot{q}_{aero_i} + \dot{q}_{rad_i} + \dot{q}_{cond_{1i}} + \dot{q}_{cond_{2i}} + \dot{q}_{cond_{3i}} + \dot{q}_{cond_{4i}}$$

and $V_i$ = elemental volume (ft.$^3$)

$\rho_i$ = material density (lb./ft.$^3$)

$Cp_i$ = heat capacity (B.t.u./lb.-° F.)

$\dot{q}_{aero_i}$ = aerodynamic heating rate (B.t.u./ft.$^2$-sec.)

$\dot{q}_{rad_i}$ = external radiation cooling (B.t.u./ft.$^2$-sec.)

$\dot{q}_{cond_{1i}} = \dot{q}_{cond_{2i}} = \dot{q}_{cond_{3i}} = \dot{q}_{cond_{4i}}$ = heat conducted to or from the element through the element faces in contact with surrounding elements (B.t.u./ft.$^2$-sec.)

$\Delta T_i$ = difference in temperature over the interval $\Delta t$ (° R.)

$\Delta t$ = time increment (sec.)

Subscript $i$ as used in the above equations has no value or physical parameters but merely denotes the specific element body under consideration and relates the true physical parameters such as volume (V), density ($\rho$), heat capacity (Cp) and the like to such particular elemental body $i$.

These curves were computed for two-inch thick leading edge structures having a 45° angle of attack during a 26,000 foot per second reentry flight. Temperature is plotted against the dimensionless ratio S/D where D is the thickness and S is the distance along the surface from the stagnation point. The curves have been computed for materials having conductivities of 18 and 1.35 B.t.u./hour-foot-° F. in the high temperature range with a representative emittance of 0.5. These properties essentially correspond to those for graphite and thorium oxide (thoria), respectively. The curves of this figure show that the asymmetric leading edge lowers the stagation line temperature about 250° F. for the lower thermal conductivity material and about 150° F. for the higher conductivity material. From this it will be seen that while conduction, radiation and heat capacity effects prevent the asymmetric leading edge from attaining a temperature reduction comparable to the approximate 50% theoretical reduction in heating rate computed by means of the laminar flow equation of Kemp and Riddle, as significant advantage still resides in the utilization of an asymmetrically configured leading edge.

Figure 5:
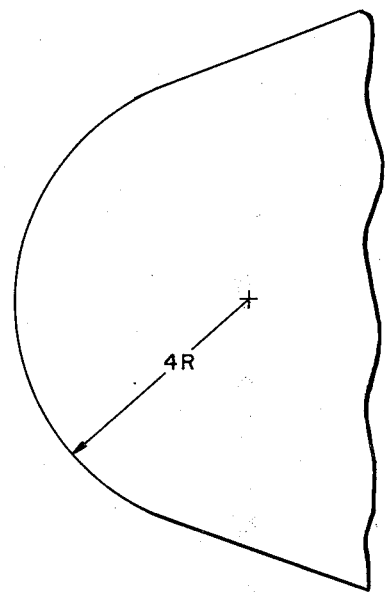
FIG. 5 is an outline plan view of an asymmetrical nose cone configuration in accordance with the present invention.
Figure 6:
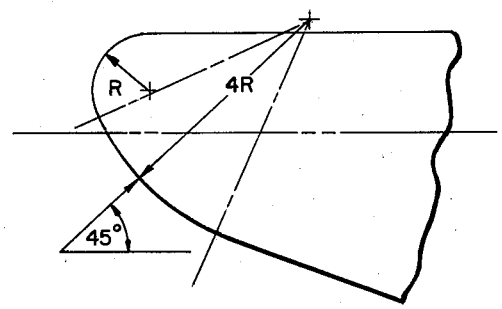
FIG. 6 is an outline elevational view of the asymmetric nose cone configuration of FIG. 5.
Figure 7:
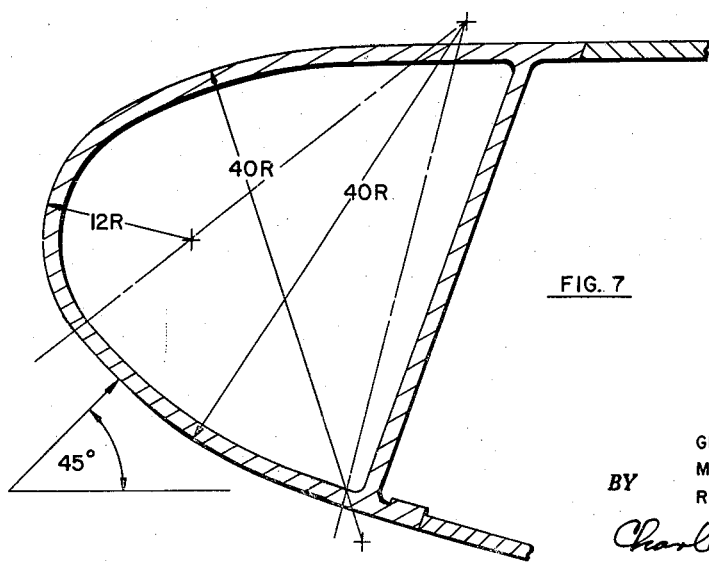
FIG. 7 is a sectional elevational view of another embodiment of an asymmetric nose cone in accordance with the present invention.

FIGS. 5 and 6 are plan and elevational outline views illustrative of a nose cone incorporating an asymmetric arrangement in accordance with this invention. As is clear from FIG. 6, this particular embodiment is configured for reentry or hypersonic cruise essentially in one attitude as shown, since it is not a body of revolution. A multiple position nose cone, as shown in FIG. 7, is capable of flight either in a normal right-side-up or an inverted attitude. Under certain conditions such as inverted attitude may be desirable for reentry from a super-orbital mission. The relative dimensions shown on these figures are merely illutrative and may be altered in accordance with specific design requirements without affecting the pertinency or applicability of the concept disclosed herein.

The configuration and dimensions of a leading edge structure may also be circumscribed by the design limits of the materials comprising the structure. Such design limits may include physical properties such as strength, modulus of elasticity, coefficient of expansion, thermal conductivity, specific weight, material melting temperature, properties of surface coatings, and excessive oxidation. While the present invention thus far has been disclosed and illustrated as being applied to a leading edge formed of a single homogeneous material, it is equally applicable to a composite leading edge structure that is divided into small segments and connected in a manner whereby excessive thermal stresses are avoided, as disclosed in the aforementioned copending application. For such an embodiment, melting temperature, resistance of surface coatings to failure and oxidation resistance properties principally govern the selection of a satisfactory material.

A number of materials, including graphite, molybdenum, columbium, chromium, tungsten, tantalum, rhodium, thorium oxide (thoria) and beryllium oxide (baryllia), exhibit satisfactory properties which permit their use in structures of the above described type. It is generally desirable to conduct as much of the heat as possible downstream and away from the immediate vicinity of the stagnation point by selecting materials of high thermal conductivity, utilizing a large thickness of material or a combination of both of these techniques. Of the listed materials, graphite has the largest ratio of thermal conductivity to specific weight and is, in general, a preferred material for a temperature resistant leading edge structure. Graphite, however, is susceptible to oxidation and erosion and must be protected by a suitable anti-oxidation coating. Carbide, nitride and silicide ceramic coatings are among those available for this purpose. Graphite, also, has the further disadvantage of possessing a very low tensile strength. Thoria and beryllia, however, are highly refractory ceramic materials that retain useable mechanical strength at elevated temperatures and are unexcelled for stability at high temperatures in oxidizing atmospheres. In addition to a high degree of chemical inertness, they possess low sublimation vapor presssures at high temperatures and thus may be used under vacuum conditions.

Figure 2:
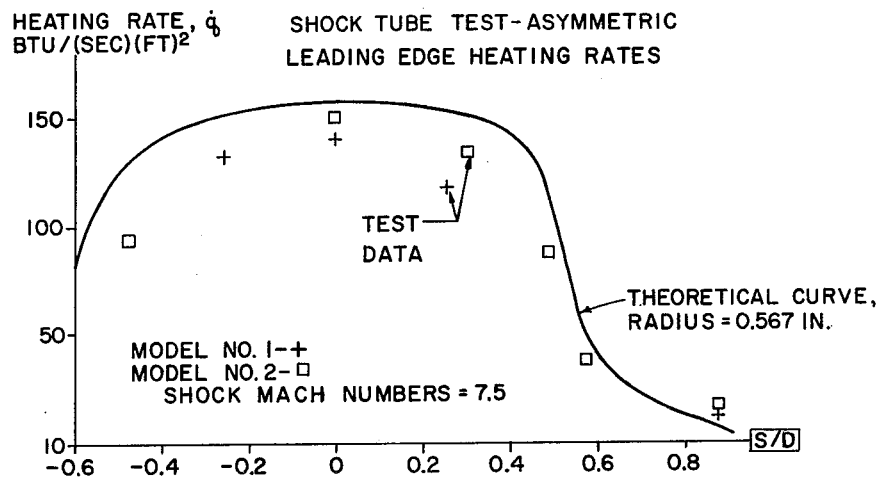
FIG. 2 is a graphical presentation of theoretical and experimental shock tube test data for a test model of an asymmetric leading edge made in accordance with the present invention.
Figure 2A:
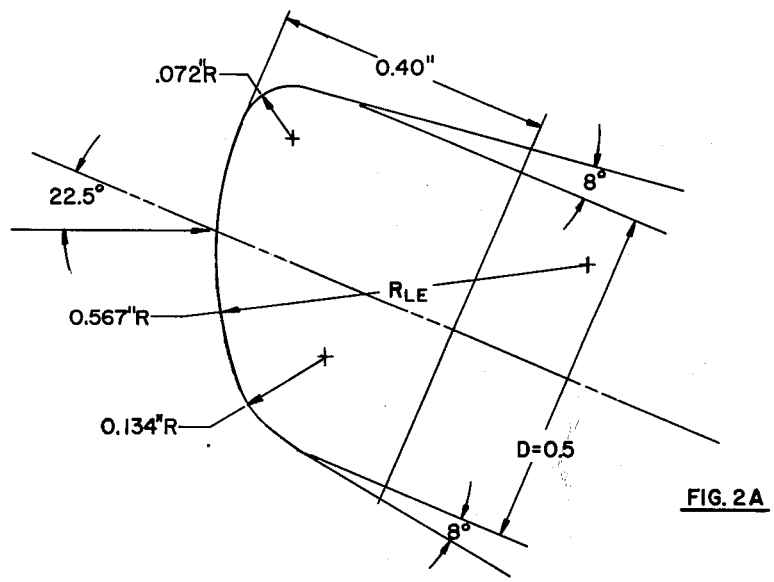
FIG. 2a shows the dimensional details of the shock tube test model.

Heat transfer tests on an asymmetric leading edge, configured in accordance with the present invention, have been conducted in a 2" x 2" shock tube test facility. The leading edge test shape and dimensions are shown in FIG. 2a, while the theoretical heating rate and the experimental results achieved during such tests are graphically presented in FIG. 2. This configuration was designed to produce lower heating rates, for a given thickness, than a symmetric circular leading edge, over a range of angles of attack from 10 to 45°. The model, which was tested at a 22.5° angle of attack and zero degree sweep, consisted of a Pyrex glass insert accurately contoured to the desired aerodynamic shape and a metal holder for the glass leading edge insert, also contoured to shape. The model span was 1¾" with a depth of about one-half inch. Thin film platinum resistance thermometers were deposited at selected locations on the central portion of the glass insert to avoid flow disturbances from end effects and the test section wall boundary layers. The average shock Mach number during testing was about 7.5 using helium as a driver gas at 315 p.s.i.a. The test section Reynolds number per foot was about $4 \times 10^4$. The flow Mach number was only about 2.5 due to the high static temperatures typical of shock tube flow. However, based on stagnation enthalpy duplications, it is estimated that the average test section conditions simulated flight conditions at approximately Mach 9. The average calculated stagnation temperature was about 6,000° F. and useful average run time was 50 microseconds. The comparative experimental and theoretical heating rate distributions over the surface of the leading edges are shown in FIG. 2 wherein the abscissa (S/D) of the plot is a dimensionless number given by the ratio of the distance S along the surface, as measured from the stagnation point, to the leading edge thickness D. It will be noted that the theoretical stagnation point heating rate for the above conditions is approximately 150 B.t.u./sec.-square foot while the experimental results are somewhat lower. For a hemicylindrical leading edge of equal thickness the sagnation point heating rate under comparable conditions would be about 200 B.t.u./sec.-square foot.

From the above description, it is evident that the heating rate, in the vicinity of the stagnation line of a leading edge, or nose cone, may be significantly reduced by the use of an asymmetric leading edge and that relatively thin, sophisticated, hypersonic leading edge structures having minimum drag and high lift-drag ratios are feasible with the configuration of this invention.

While particular embodiments of this invention have been illustrated and described herein, it will be apparent that various changes and modifications may be made in the construction and arrangement without departing from the spirit and scope of this invention in its broader aspects, or as defined in the following claims.

We claim:

1. An airfoil including a leading edge member, said leading edge member comprising a temperature and shock resistant body having upper and lower surfaces interconnected by a leading edge portion, said leading edge portion having a bluntly curved external surface that is nontangent to said upper and lower surfaces, and which has its maximum chord substantially normal to the direction of airflow when the airfoil is disposed at a relatively large angle of attack.

2. An asymmetric leading edge member for an airfoil surface comprising a body of a temperature and shock resistant material, said body having top and bottom surfaces connected across the front edge by a leading edge, and said leading edge portion having a front surface with a radius of curvature greater than the distance between said top and bottom surfaces, with the center of curvature being above the median plane between said top and bottom surfaces whereby said leading edge portion presents a bluntly curved surface sloping downwardly and rearwardly from its upper edge.

3. An asymmetric leading edge member for a hypersonic velocity vehicle comprising a hollow body of a temperature and shock resistant material, said body having diverging top and bottom walls connected at their front edge by a leading edge wall portion, said leading edge wall portion including a bluntly curved frontal surface having a radius of curvature substantially larger than the thickness of the body member as measured between the outer surface of said top and bottom walls, and said bluntly curved frontal surface sloping downwardly and rearwardly from its upper congruence with said top wall whereby such frontal surface is substantially normal to the airstream through a predetermined range of large angles of attack and the stagnation point lies on such frontal surface at various locations depending on such angle of attack.

4. An asymmetric leading edge member for a hypersonic velocity vehicle, as set forth in claim 3, wherein said bluntly curved frontal surface is smoothly faired into the outer surfaces of said top and bottom walls by arcuate surfaces, each of which has a radius of curvature substantially less than that of the bluntly curved frontal surface.

5. An asymmetric leading edge member for a hypersonic aerospace vehicle comprising a hollow refractory body having a generally U-shaped cross section including a base portion and two leg portions connected by said base portion, the leg portions of said body having attachment points for connection to an airfoil structure to be protected during reentry into the earth's atmosphere, said base portion forming a leading edge of said member and being angularly disposed relative to said two leg portions at a predetermined angle whereby during reentry into the earth's atmosphere at hypersonic velocity such leading edge is substantially normal to the direction of the airflow, and said leading edge base portion having a relatively blunt curved surface for containing the stagnation point thereon through a considerable range of angles of attack.

References Cited in the file of this patent

UNITED STATES PATENTS 3,028,128     Friedrich _____ Apr. 3, 1962